Feb. 24, 1942.    B. W. MAHONEY ET AL    2,274,422
ELECTRICAL CONNECTION
Filed Jan. 20, 1940
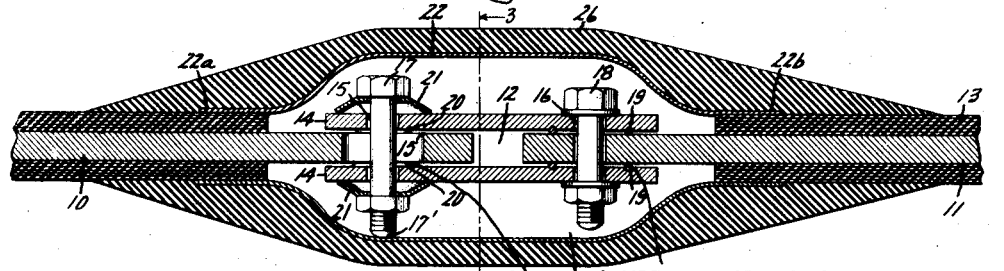
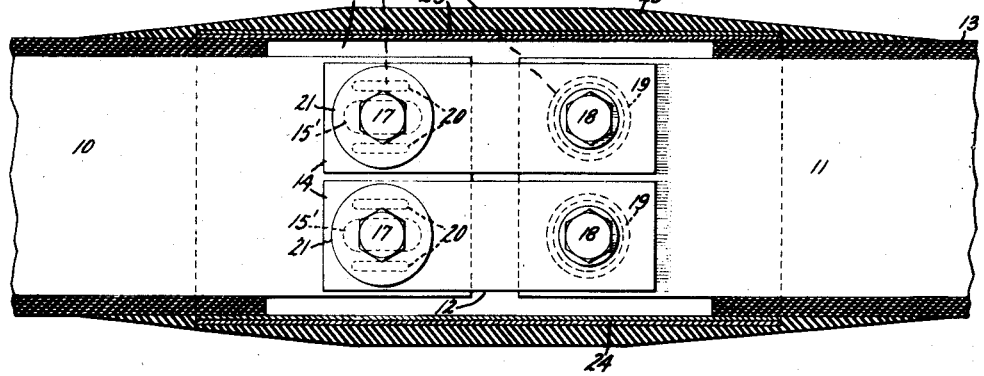
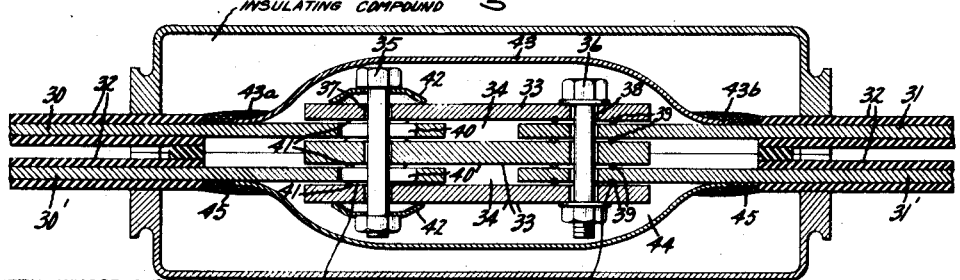
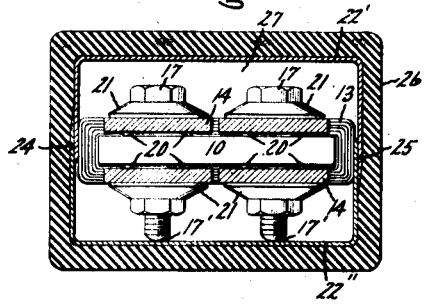
Inventors:
Bertram W. Mahoney,
George M. Reed,
by Harry E. Dunham
Their Attorney Patented Feb. 24, 1942

2,274,422

UNITED STATES PATENT OFFICE 2,274,422

ELECTRICAL CONNECTION

Bertram W. Mahoney, Drexel Hill, and George M. Reed, Kirklyn, Pa., assignors to General Electric Company, a corporation of New York Application January 20, 1940, Serial No. 314,844

9 Claims. (Cl. 174—73)

Our invention relates to electrical connections and more particularly to an expansion joint for high-voltage insulated bus bars.

High-voltage insulated bus bars are frequently used in locations where the ambient temperature varies over a very wide range. The coefficient of expansion for the usual insulating materials is very low so that the expansion and contraction of these materials may be entirely neglected without appreciable error. On the other hand, the coefficient of linear expansion of copper from which bus bars are usually constructed is relatively high. With a temperature variation of 100° C., a change in length of approximately $\frac{5}{32}$ inch occurs in a twenty foot lineal length of copper bus bar. Obviously, in long bus runs, expansion joints must be provided to take care of the expansion and contraction of the bus bars, as the case may be, with temperature changes.

In bus bar installations for very high voltage systems, additional problems are presented in connection with expansion joints where it is necessary to use insulated bus bars. Since the coefficient of expansion of the insulating material is negligible, it would appear that expansion and contraction of the copper bus bar would cause extrusion or withdrawal, respectively, thereof relative to the insulation, and experience has shown this to be true where insulated bus bars were subjected to high temperatures. A further problem is also presented in connection with the expansion joints for high-voltage bus bars because of the sharp edges and points which are conducive to the formation of corona, and means for eliminating this difficulty should, therefore, be provided.

Accordingly, it is an object of our invention to provide a new and improved expansion joint for bus bars.

It is another object of our invention to provide an insulated expansion joint for high-voltage insulated bus bars.

It is a further object of our invention to provide an expansion joint between insulated high-voltage bus bars which may be readily insulated to the same degree as the rest of the bus bar without in any way hampering its ability to provide for expansion and contraction of the bus bars.

Still another object of our invention is to provide an expansion joint for insulated high-voltage bus bars wherein the formation of corona is eliminated.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawing in which Fig. 1 is a plan view in cross section of an expansion joint embodying our invention; Fig. 2 is a side view partly in section of the expansion joint shown in Fig. 1; Fig. 3 is a sectional view taken along line 3—3 of Fig. 1; Fig. 3a is a sectional view illustrating a modification of the electrical connections shown in Figs. 1 to 3; and Fig. 4 is a view in cross section of a modification of the expansion joint illustrated in Fig. 1.

Referring now to Figs. 1 to 3 of the drawing, we have illustrated an expansion joint for connecting the adjacent ends of aligned bus bars 10 and 11 which comprise flat rigid strips of a material of high electrical and thermal conductivity, preferably copper. These bus bars 10 and 11 have the adjacent ends thereof spaced apart for expansion purposes so as to form a gap 12. In order that bus bars 10 and 11 may be suitable for high-voltage installations, they are provided with a suitable insulation 13 which may comprise, for example, varnished cambric tape. However, a portion of the adjacent ends of bus bars 10 and 11 are uninsulated in order that good electrical connections can be made. These connections are illustrated as being formed by means of a plurality of pairs of clamping plates 14 which are disposed on opposite sides of the uninsulated portions of bus bars 10 and 11 so as to bridge the gap 12 therebetween. These clamping plates or members 14 overlap with the respective bus bars 10 and 11 so as to provide a plurality of juxtapositioned contacting surfaces which will be described in greater detail hereinafter. A plurality of aligned openings 15 and 16 are provided in plates 14 and bus bars 10 and 11, respectively, through which suitable fastening means, such as bolts 17 and 18, are inserted for interconnecting the bus bars 10 and 11 with clamping plates 14. The contacting surfaces of clamping plates 14 overlapping bus bar 11 are provided with raised restricted contact portions 19 of a metal whose oxide does not substantially interfere with electrical current conduction, for example, silver. These raised restricted contact portions 19 are preferably annular in form comprising a ring of silver wire bonded to the bus bar 11 or, as illustrated, bonded to clamping plates 14 concentric with bolt or fastening means 18. Such a contact is described and claimed in copending application Serial No. 314,826, filed January 20, 1940, on an application of William J. Weder and Winton G. Harlow.

In order to allow for relative movement between the bus bars 10 and 11, one of the aligned openings in the bus bars or clamping plates may be in the form of an elongated opening or slot. We have illustrated such an elongated opening or slot 15' in bus bar 10 aligned with the openings 15 in plates 14. Raised restricted contact portions 20 similar to contacts 19, also formed of a metal whose oxide does not substantially interfere with electrical current conduction, are provided on plates 14 so as to provide line contact between plates 14 and bus bar 10. These line contacts may be suitably formed of silver wire bonded to plates 14. However, contact portions 20 are not annular as are contact portions 19 but rather may comprise straight pieces of silver wire arranged adjacent elongated slot or opening 15 in bus bar 10 and parallel therewith so as to provide good contact without impeding relative movement between plates 14 and bus bar 10. Spring washers 21 are provided for bolt or fastening means 17 at either end thereof adjacent plates 14 in order to control or adjust the contact pressure between plates 14 and bus bar 10. In this way, good electrical contact is provided without interfering with relative movement between plates 14 and bus bar 10 caused by temperature variations.

If the expansion joint for bus bars just described were used in very high voltage installations without any additional apparatus, difficulties due to the formation of corona might be encountered in view of the points and sharp corners which are present. To eliminate the formation of corona, we surround the joint with a metallic shield 22, preferably formed of a pair of thin copper channels 22' and 22'', respectively, Fig. 3, which overlap at 24 and 25 to form a boxlike shield around the expansion joint. This shield has the open ends 22a and 22b thereof closely fitting against the insulation 13 of bus bars 10 and 11 respectively, so as to be stationary with respect to the expansion and contraction movements of bus bars 10 and 11 which are extended from and withdrawn into insulation 13 when subjected to temperature changes. Suitable insulation 26, which may preferably be of the same type as insulation 13, is provided around metallic shield 22 so as to provide insulation for the expansion joint of the same degree as insulation 13 provided for bus bars 10 and 11. To eliminate corona in the dead air space 27 surrounding the expansion joint, metallic shield 22 is maintained at the same potential as bus bars 10 and 11 by having the end 17' of one or more of the bolts or fastening means 17 electrically connect metallic shield 22 and bus bars 10 and 11.

Although we have described an arrangement embodying our invention wherein the raised restricted contact portions 19 and 20 are provided on plates 14, it will be understood by those skilled in the art that these contact portions could just as well be provided on bus bars 10 and 11. Also where the bus bars are not aligned, the expansion joint could be produced without clamping plates 14 by merely overlapping the bus bars 10 and 11 and utilizing the arrangement for providing expansion described above. These modifications are illustrated in Fig. 3a where the corresponding parts thereof are designated by the same reference numerals as in Figs. 1 to 3.

Where the insulated high-voltage bus bars are provided with molded insulation, it may be desirable to provide an insulated expansion joint wherein the insulation around the joint comprises a compound held in a suitable compound box. Accordingly, in Fig. 4, we have illustrated our invention as applied to a double bus bar structure comprising bus bars 30—30' and 31—31' covered with a molded insulation 32. The expansion joint is similar to that illustrated in Figs. 1 to 3 except that groups of three clamping plates 33 are required instead of pairs of clamping plates where single bus bars are involved. In order to provide for expansion between bus bars 30—30' and 31—31', suitable gaps 34—34' are provided between the bus bars which are bridged over by clamping plates 33 fastened to the bus bars by suitable fastening means comprising bolts 35 and 36 passing through aligned openings 37 and 38, respectively. Raised restricted contact portions in the form of annular rings 39 of silver wire or other suitable material are provided for the juxtapositioned surfaces of plates 33 and bus bars 31—31'. Bus bars 30—30' are provided with elongated slots 40—40' to provide for expansion or contraction adjacent which and parallel therewith are line contacts 41 extending longitudinally of bus bars 30—30' so as to provide good electrical contact without interfering with relative movement between plates 33 and bus bars 30—30'. Spring washers 42 are included to provide the desired contact pressure. In order to eliminate the formation of corona and also to support the insulation around the expansion joint, we provide a metallic shield 43 similar to the shield disclosed in Figs. 1 to 3 completely surrounding the expansion joint and providing a dead air space 44. The ends of the metallic shield 43a and 43b are located against bus bars 30—30' and 31—31' respectively, so as to maintain the metallic shield at the same potential as the bus bars. A suitable packing material 45 is placed between the ends 43a and 43b of metallic shield 43 and molded insulation 32 so as to allow for relative movement between the shield 43 and the respective bus bars. This packing material 45 may comprise felt or cotton tape or other suitable material which may be compressed readily. A compound box 46 is then placed around the joint including metallic shield 43 and the space between metallic shield 43 and compound box 46 is filled by pouring in a suitable hot insulating compound after assembly of the joint. The packing 45 prevents the insulating compound from entering the joint and also allows the copper bus bars to move without unnecessary pulling on the compound surrounding the joint.

While we have described certain particular embodiments of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In an expansion joint for connecting the adjacent ends of bus bars comprising a pair of overlapping members having aligned openings therein, one of said openings comprising an elongated slot extending in the direction of expansion of said bus bars, a raised restricted contact portion of a metal whose oxide does not substantially interfere with electrical current conduction between said overlapping members and extending longitudinally of said slot and parallel therewith so that relative movement between said members may readily occur, and fastening means cooperating with said aligned openings including means for adjusting the contact pressure between said members.

2. In an expansion joint for connecting the adjacent ends of high-voltage insulated bus bars comprising a pair of uninsulated overlapping members having aligned openings therein, one of said openings comprising an elongated slot extending in the direction of expansion of said bus bars, a raised restricted contact portion of a metal whose oxide does not substantially interfere with electrical current conduction between said overlapping members and extending longitudinally of said slot and parallel therewith so that relative movement between said members may readily occur, fastening means cooperating with said aligned openings including means for adjusting the contact pressure between said members, and a metallic shield completely surrounding said connection for supporting the insulating material around said expansion joint.

3. In an expansion joint for connecting the adjacent ends of aligned high-voltage bus bars comprising a pair of clamping plates disposed on opposite sides of and bridging said bus bars, said plates and bus bars having aligned openings therein, fastening means cooperating with said aligned openings for clamping said plates to said bus bars, raised restricted contact portions of a metal whose oxide does not substantially interfere with electrical current conduction provided for each pair of juxtapositioned surfaces of said plates and bus bars, one of said aligned openings in said plates or bus bars being elongated in a direction extending longitudinally of said bus bars, and said restricted contact portion adjacent said elongated opening being parallel therewith so that relative movement between said bus bars may readily occur without affecting the conductivity thereof.

4. In an expansion joint for connecting the adjacent ends of aligned high-voltage bus bars formed as flat rigid strips with a gap for expansion between the adjacent ends thereof, a pair of clamping plates disposed at opposite sides of said bus bars and bridging said gap therebetween, said plates and bus bars including aligned openings therein, fastening means cooperating with said openings for clamping said plates to said bus bars, a raised restricted contact portion of a metal whose oxide does not substantially interfere with electrical current conduction provided for the juxtapositioned surfaces of said plates and bus bars, said opening in one of said bus bars being elongated in a direction extending longitudinally of said bus bars, said restricted contact portion adjacent said elongated opening extending longitudinally of said opening and parallel therewith so that relative movement between said bus bars may readily occur without affecting the conductivity thereof, and means associated with said fastening means for controlling the contact pressure between said juxtapositioned surfaces adjacent said elongated opening.

5. In an expansion joint for connecting the spaced adjacent ends of aligned high-voltage insulated bus bars formed as flat rigid strips without insulation adjacent the ends to be joined, a pair of clamping plates disposed at opposite sides of the uninsulated ends of said bus bars and bridging the gap therebetween, said plates and bus bars having aligned openings therein, fastening means cooperating with said openings, silver line contacts provided for the juxtapositioned surfaces of said plates and bus bars, one of said aligned openings in said plates or bus bars forming an elongated slot extending in the direction of expansion of said bus bars, said silver line contacts adjacent said slot being parallel therewith to provide for relative movement between said bus bars, and a metallic shield completely enclosing said connection for supporting the insulating material surrounding said joint.

6. In an expansion joint for connecting the adjacent ends of high-voltage insulated bus bars, a pair of uninsulated overlapping members including aligned openings therein, one of said openings comprising an elongated slot extending in the direction of expansion of said bus bars, a raised restricted contact portion of a metal whose oxide does not substantially interfere with electrical current conduction between said overlapping members and extending longitudinally of said slot and parallel therewith so that relative movement between said members may readily occur, fastening means cooperating with said aligned openings including means for adjusting the contact pressure between said members, and a metallic shield completely surrounding said connection for supporting the insulating material around said expansion joint, one of said fastening means being so constructed and arranged as to contact said metallic shield whereby said shield is maintained at the same potential as said bus bars.

7. An insulated joint for connecting the adjacent ends of high-voltage insulated bus bars comprising, a pair of uninsulated overlapping members, fastening means for maintaining said members in current carrying contact, expansion means for permitting relative longitudinal movement between said members without substantially impairing the current carrying ability of said contact, a metallic shield surrounding said joint for supporting insulating material, said fastening means being so constructed and arranged as to contact said metallic shield for maintaining said shield and bus bars at the same potential whereby corona within said metallic shield is prevented.

8. In an insulated joint for connecting the adjacent ends of high-voltage insulated bus bars comprising a pair of uninsulated overlapping members, fastening means for holding said members together, a metallic shield surrounding said joint, the ends of which contact with said uninsulated overlapping members to prevent corona from forming within said metallic shield, packing means adjacent the ends of said metallic shield, a casing surrounding said metallic shield and forming a space therebetween, and an insulating compound within said space for providing insulation for said joint, said packing means preventing said insulating compound from entering the space within said metallic shield.

9. An insulated joint for connecting the adjacent ends of high-voltage insulated bus bars comprising, a pair of uninsulated overlapping members, fastening means for maintaining said members in current-carrying contact, expansion means for permitting relative longitudinal movement between said members without substantially impairing said current-carrying contact, a metallic shield surrounding said joint, said fastening means being so constructed and arranged as to contact said metallic shield for maintaining said shield and overlapping members at the same potential whereby corona within said metallic shield is prevented, and insulating means around said joint supported by said metallic shield.

BERTRAM W. MAHONEY.
GEORGE M. REED.